(12) United States Patent
Monostory

(10) Patent No.: US 8,146,219 B2
(45) Date of Patent: Apr. 3, 2012

(54) PORTABLE RENEWABLE ENERGY BOX SYSTEM

(76) Inventor: Erik J. Monostory, Rochester, NY (US)

( * ) Notice: Subject to any disclaimer, the term of this patent is extended or adjusted under 35 U.S.C. 154(b) by 706 days.

(21) Appl. No.: 12/267,132

(22) Filed: Nov. 7, 2008

(65) Prior Publication Data

US 2010/0117369 A1    May 13, 2010

(51) Int. Cl.
*F03D 11/04*    (2006.01)

(52) U.S. Cl. ............................. 29/55; 415/4.3; 52/149

(58) Field of Classification Search .............. 290/54–55, 290/43, 44; 52/110, 114, 118, 146, 148–152, 52/121; 405/203, 204, 224; 415/2.1, 4.2, 415/4.3, 4.5, 7; 416/132 B, 111, 117, DIG. 4; 60/398; 104/24; 114/39.21
See application file for complete search history.

(56) References Cited

U.S. PATENT DOCUMENTS

| 5,611,177 A * | 3/1997 | Herbstritt ........................ 52/111 |
| 6,782,667 B2 * | 8/2004 | Henderson ...................... 52/116 |
| 7,062,883 B1 * | 6/2006 | Langholz et al. ............... 52/110 |
| 7,105,940 B2 * | 9/2006 | Weesner et al. ................. 290/44 |
| 2004/0169376 A1 * | 9/2004 | Ruer et al. ...................... 290/55 |

* cited by examiner

*Primary Examiner* — Quyen Leung
*Assistant Examiner* — Eric Johnson
(74) *Attorney, Agent, or Firm* — Don W. Weber

(57) ABSTRACT

A small, easily transportable wind turbine system has a square rail base secured to the ground by stakes and by its own weight. Slanted vertical legs connect a smaller square upper support perimeter to the base. A three-section telescoping mast is attached to the base and to the upper support. Winches and guy wires raise the second mast. As the second mast is raised, static guy wires raise the third mast. A wind generating turbine is attached to the top of the third mast. A controller senses the maximum output of the turbine and raises or lowers the height of the masts such that the minimum wind speed necessary to produce the maximum electric output is produced. The controller also feeds energy to a battery storage system and directly to a utility panel.

7 Claims, 6 Drawing Sheets

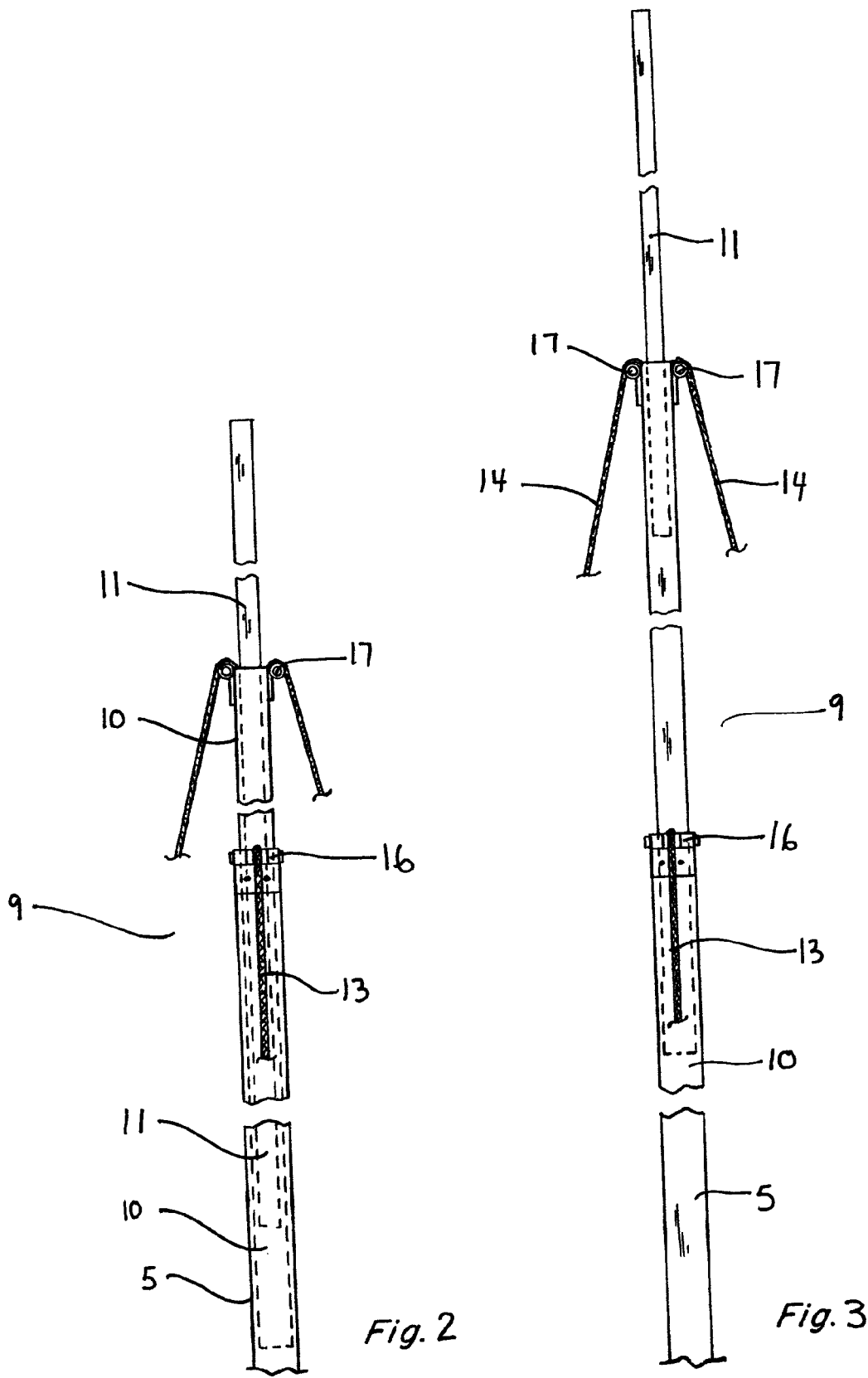

PORTABLE RENEWABLE ENERGY BOX SYSTEM

BACKGROUND OF THE INVENTION

This invention relates to the field of small, transportable electric power generators. In particular, a small, highly portable wind generator is presented that has an automatically extending and positioning mast.

Energy is the largest economy in the world. The need to find energy sources independent of oil is a widely recognized and sought after goal. Wind and solar power have been recognized as good alternate energy sources. However, most wind generating systems require large amounts of land and large available wind sources. Wind generators in places such as Palm Springs and Sacramento Calif. are examples of such large wind generator locations.

The tower is one of the most significant parts of a wind generator. The three major types of towers are the guyed tower, the tilt-up tower and the self-supporting tower. Each type of tower needs a prefabricated foundation of reinforced concrete and each tower is permanently attached to the ground.

An average wind generating turbine has a mast of 200 to 250 feet, with a total height including the blades of nearly 340 feet. Even smaller wind turbines have a hub height of over 100 feet and a total height of 125 feet. Small wind turbines are defined as wind powered electric systems for homes, farms and small sized businesses which produce less than 100 kilowatts (kW). It is an object of this invention to provide a self-contained renewable energy source for individual use that generates 2.5 kW and is less than 40 feet in height.

Larger wind turbine systems require construction and permanent placement. Heavy machinery, permanent foundations, concrete footings and bases and expensive outlays for land are prerequisites for the erection of larger wind turbine systems. It is another object of this invention to provide a small wind turbine electrical generation system that can be easily and readily transported and erected requiring no heavy equipment or permanent foundations.

Retractable towers have been known in the prior art for such uses as cranes, satellite dishes on news vans and mobile cell phone structures. However, these towers are not designed for extended periods of horizontal wind forces and do not contain dampeners for vibrational forces. These known towers cannot be used for varying dynamic loads such as are encountered in spinning turbine blades and engines. It is a further and other object of this invention to provide a small, highly portable retractable tower for a wind turbine.

Other and further objects of this invention will become obvious upon reading the below description of the preferred embodiment.

BRIEF DESCRIPTION OF THE INVENTION

A renewal energy box (REB) is a self-contained small wind turbine affixed to a telescoping mast that generates power to a battery system and/or a grid for household, farm or commercial use. The REB has an essentially square rail base. Vertically inwardly sloping rails connect the lower base to an essentially square buy smaller upper tower support. A central telescoping mast has two additional nested sections located inside the main lower mast. Guy wires attached to the bottom of the second mast are looped around rollers attached to the top of the main mast and attached to winches on the tower support that act in unison. Third mast guy wires are permanently attached to the bottom of the third mast, looped around third mast rollers attached to the top of the second mast and statically attached to the upper tower support. When the winches retract the second mast guy wires, the second mast moves upwardly. This action of the second mast moves the third mast upwardly. The guy wires are always in tension adding to the stability of the structure and dampening the vibrations of the spinning turbine.

A wind turbine is attached to the top of the third mast. The wind turbine generates electric power to the system through a controller or microprocessor. The controller senses the electric energy or power (kW) generated by the turbine. As the turbine reaches its maximum output, the controller is capable of operating the winches to raise or lower the masts to find the optimum height of the turbine.

The electric power generated by the turbine can be stored in a battery system of fed directly to an inverter and on to a utility panel. The system also contemplates the use of solar panels as an additional energy source. A hydrolyzer can also be added to use the electric power generated to convert water to hydrogen and oxygen.

The REB is highly transportable and may be deployed at various locations without the use of heavy machinery or permanent foundations.

BRIEF DESCRIPTION OF THE DRAWINGS

FIG. 2 is a partial view of the three tower masts with the second and third masts partially extended.

FIG. 3 is a partial view of the three tower masts with the second and third masts extended further than the length shown in FIG. 2.

DETAILED DESCRIPTION OF THE PREFERRED EMBODIMENT

The renewable energy box system is a highly transportable and stable energy generating system that utilizes wind and solar power to produce electricity for homes, farms and other small energy consuming units.

Figure 1:
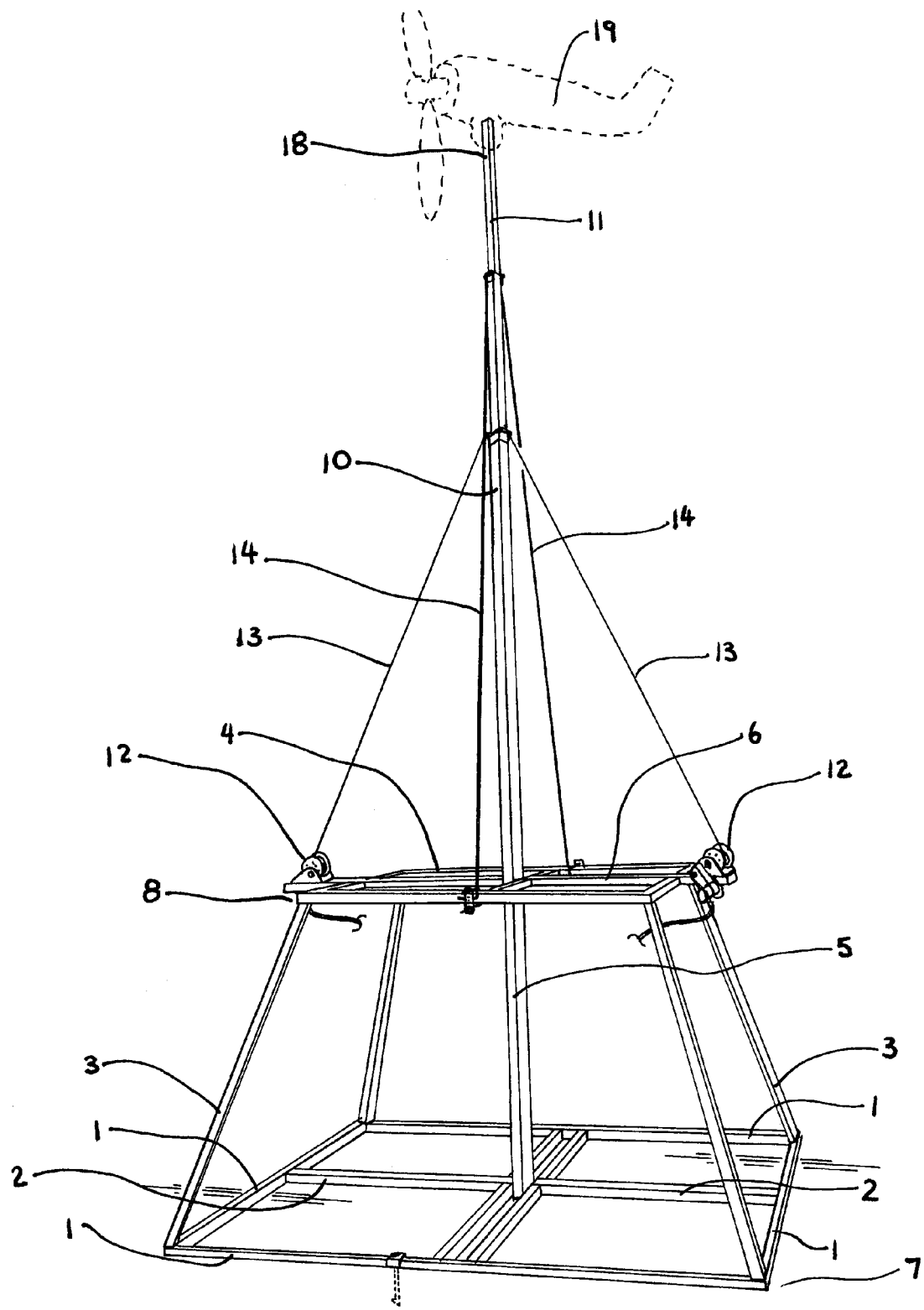
FIG. 1 is a perspective view of the fully deployed renewable energy tower with the wind generator rotor shown in phantom lines.

The renewable energy box has a base in the shape of a square pyramid as shown in FIG. 1. A plurality of lower perimeter base rails 1 are connected to form an essentially square lower base 7. These perimeter base rails 1 are reinforced by inner reinforcing rails 2. The base is essentially square in the preferred embodiment, reinforced by the inner rails 2 as shown in FIG. 1.

Attached to the perimeter base rails 1 at each corner are vertical pyramidal risers 3. The pyramidal risers 3 slope upwardly and inwardly and connect the lower perimeter base rails 1 to the upper perimeter tower rails 4. These upper pyramidal tower rails 4 form a smaller essentially square upper tower support 8 to support the main mast 5. The upper tower rails 4 are interconnected and reinforced by upper tower reinforcing rails 6.

While the configuration of the perimeter and reinforcing rails shown in FIG. 1 is preferred, it is to be appreciated that the geometric shape of the supporting base 7 and upper tower support 8 can be of different shapes and still be within the spirit and scope of the invention. For example, the lower supporting base 7 and upper tower support 8 could be round or triangular. Additionally, the inner reinforcing rails could be of any suitable configuration sufficient to reinforce the lower base 7 and the upper tower support 8.

The central tower 9 has three sections. A lower main mast section 5 has its lower end secured to the lower base 7 and a higher part secured to the upper tower support 8 as shown. In the preferred embodiment, the main mast 5 is approximately 16 feet high. The distance between the lower base 7 and the upper tower support 8 is approximately 5 feet. The main mast 5 is connected to the upper tower support at approximately one-third of the vertical height of the main mast section as shown.

A second mast section 10 is nested inside the main mast 5. A third upper mast section 11 is nested inside the main 5 and second 10 mast sections as best shown in FIGS. 2 and 3. These telescoping mast sections 10 and 11 and the mechanism used to automatically raise these sections form a significant part of the new invention.

Figure 4:
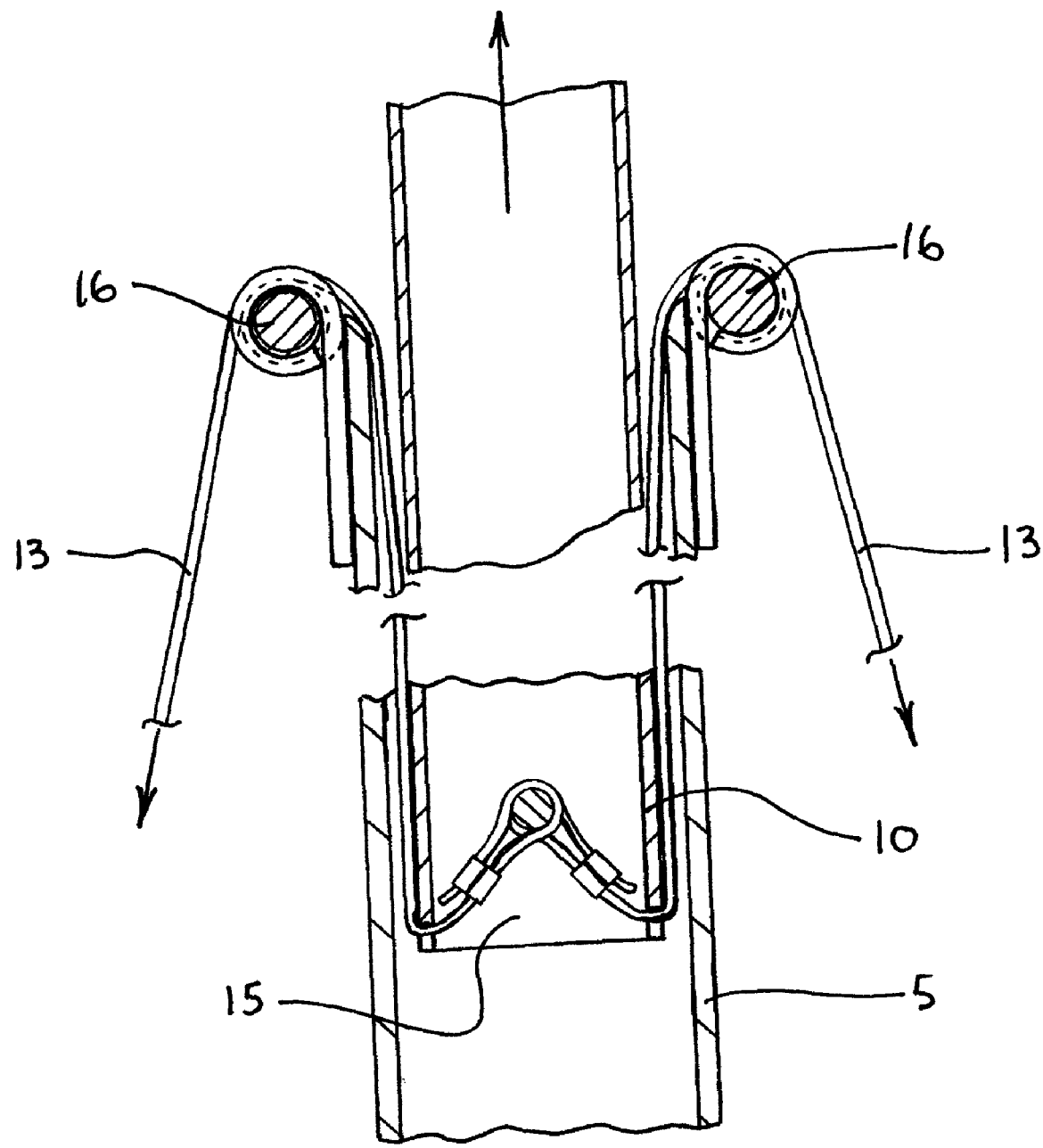
FIG. 4 is a partial cutaway view of the main and second masts of the tower showing the guyed wires and rollers.

Electric winches 12 are secured to opposite sides of the upper tower support 8 in the preferred embodiment. The winches operate simultaneously in unison to raise the tower. Second mast guy wires 13 and third mast guy wires 14 are used in connection with the winches to raise the mast sections. One end of each second mast guy wire is attached to a corresponding winch 12 and the other end of the second mast guy wire 13 is attached to the lower end 15 of the second mast as best shown in FIG. 4. Each second mast guy wire 13 may be attached as shown in drawing FIG. 4 or it may be attached by any other convenient and efficient means such as by bolts or welds.

A plurality of upper second mast rollers 16 are secured to the upper end of the main mast 5 as shown in FIGS. 2, 3 and 4. These second mast rollers 16 enable the winches and guy wires to raise the second mast when the winches are rotated to take up the second mast guy wires 13.

Figure 5:
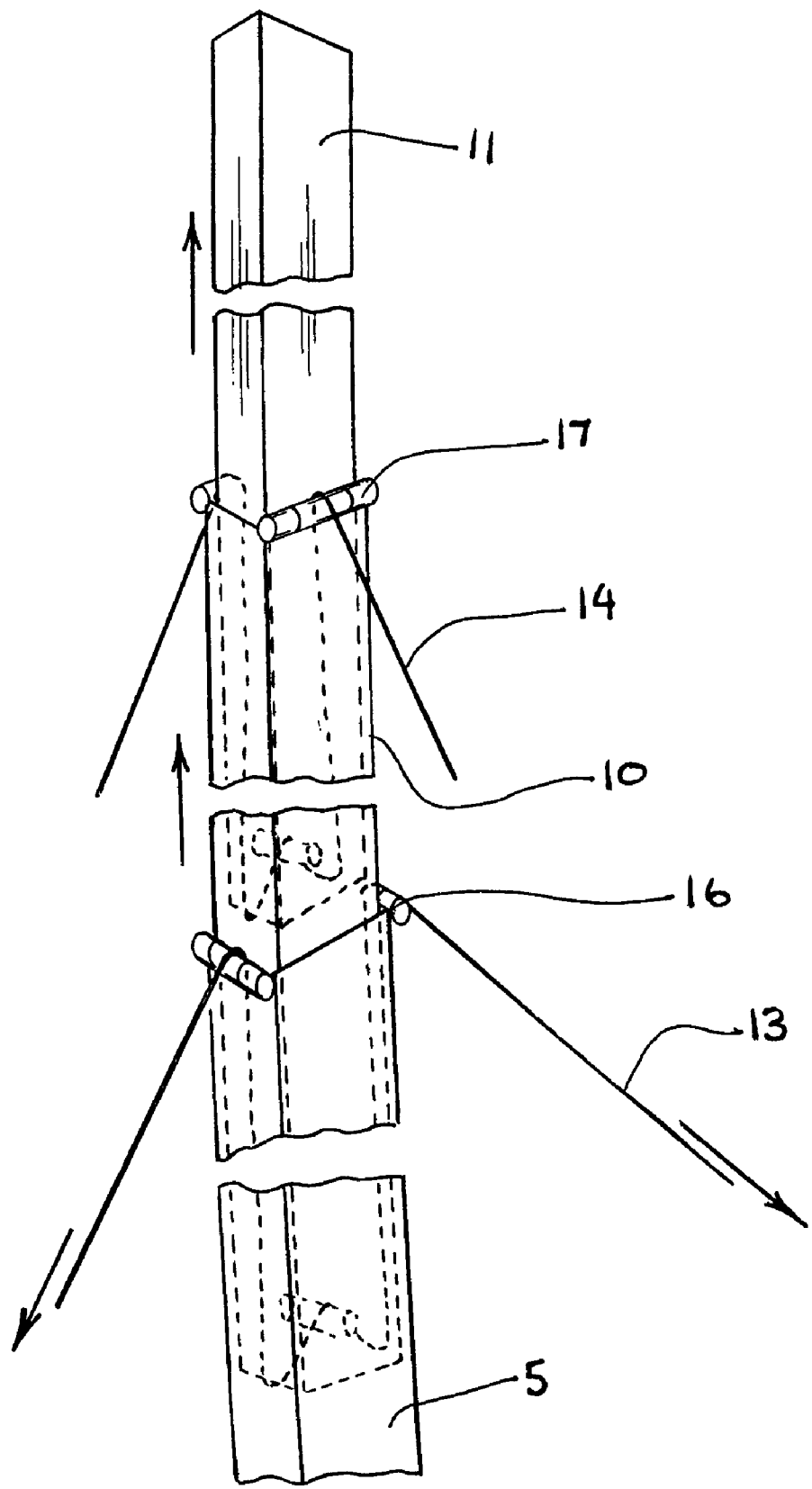
FIG. 5 is a partial perspective view of the main, second and third masts showing the guyed wires and rollers lifting mechanism for the tower.

A plurality of static third mast guy wires 14 are attached to the third mast and to the upper tower base 8. One end of each static guy wire 14 is secured to the upper tower base 8 and the other end of the static third mast guy wire 14 is attached to the lower end of the third mast. Third mast rollers 17 are attached to the upper end of the second mast 10 as shown in FIGS. 2, 3 and 5. The third mast guy wires 14 loop around the third mast rollers 17. As best shown in FIG. 5, when the winches pull the second mast guy wires 13 in the direction of the arrow, the second mast 10 is raised and the upper end of the second mast moves upward vertically. This upward vertical motion of the second mast pulls the third mast upwards since the third mast guy wires are a fixed length and are attached to the tower support and to the lower end of the third mast.

Due to the unique arrangement of the winched second mast guy wires 13 and the fixed length static guy wires 14, the top of the tower 18 raises as the winches pull in the guyed wires 13. In the preferred embodiment shown, the tower reaches a maximum height of approximately 36 feet when fully extended. However, towers of varying height are within the contemplation of this invention and much higher towers are compatible with the spirit of this disclosure. The guy wires 13 and 14 not only extend the height of the tower, they also stabilize the extended tower since they are secured to the upper tower support and remain taught while the tower is in operation. In the preferred embodiment, the second mast guy wires are located on first opposite parallel sides of the essentially square second mast while the third mast guy wires are located on parallel opposite sides of the third mast that are perpendicular to the first parallel opposite sides. This ninety degree difference between the attachment of the second mast guy wires and the third mast guy wires helps to stabilize the entire tower system.

When the guy wires are lengthened by movement of the winches, the masts all move downward due to their inherent weight.

For added stability, the lower base 7 can be secured to the ground by stakes, bolts or any other efficient securing means.

The guy wires are made of webbing or weaved polymer fibers in the preferred embodiment. However, they could be made of cable, rope or any other type of suitable material while still keeping within the spirit and scope of this disclosure.

Additionally, it is to be appreciated that a different number of winches could be used as, for example, four second mast winches instead of two could be attached to the upper perimeter tower rails and second mast section. In this embodiment, a separate winch would be attached to each of the four upper tower perimeter sections. Four upper second mast rollers 16 would be attached to the upper part of the second mast and four guyed wires 13 would be attached to the four winches 12 and the lower end 15 of the second mast 10, respectively. The four mast system, with four guyed wires, is more stable.

A wind turbine generator is affixed to the top of the third mast 11 as shown in FIG. 1. This turbine generates electric energy as wind turns the propeller of the turbine.

Figure 6:
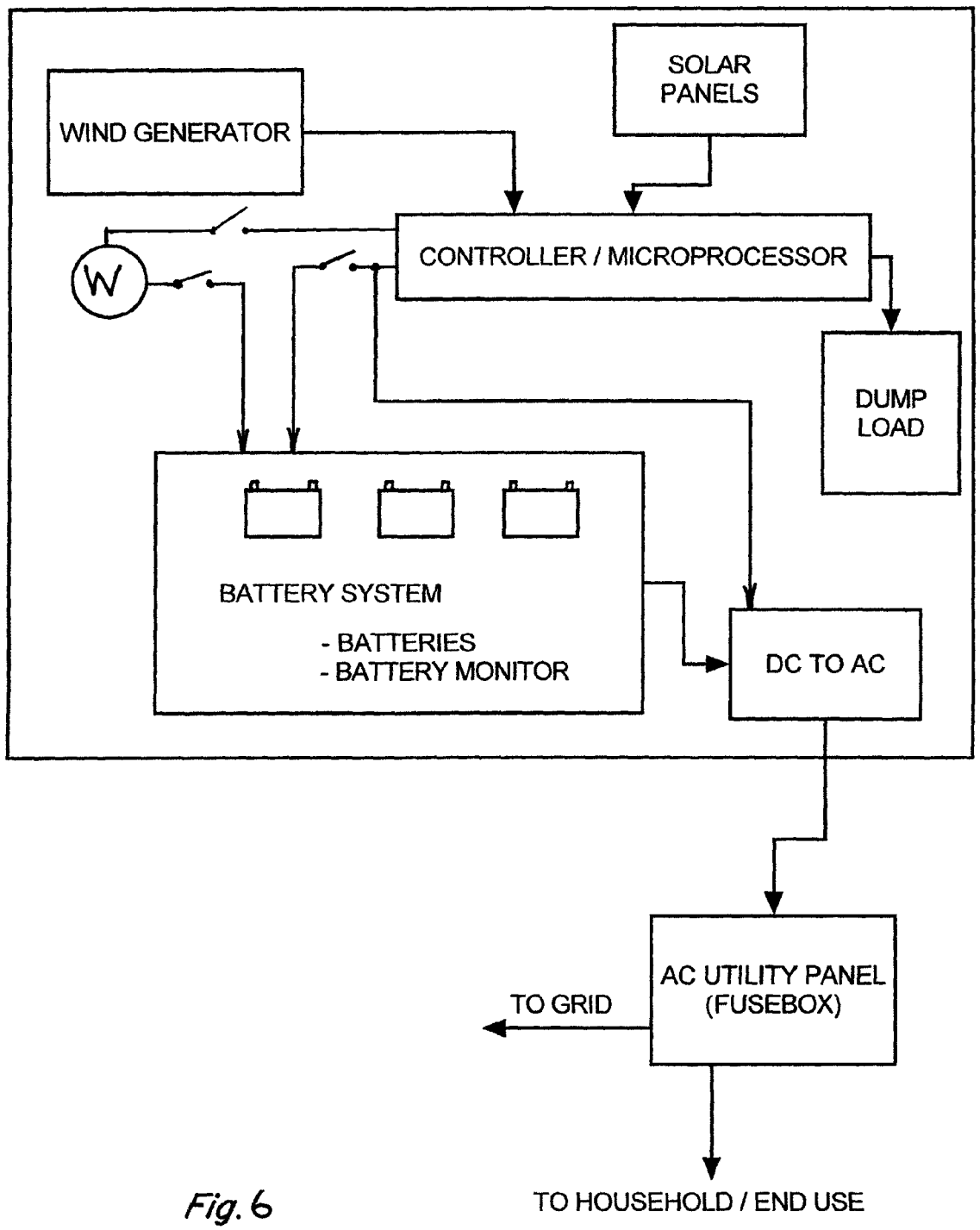
FIG. 6 is a block diagram of the energy generating electronics of the invention with the inverter inside the electronics package.

Turning now to the electronic package of the portable renewable energy box, a schematic block diagram of the system is shown in FIG. 6. A typical renewable energy system could have both a wind turbine system and a solar power system. The electricity generated in the present invention is fed into a controller/microprocessor. The controller actuates the winch system W and optimizes the efficiency of the wind turbine as will be explained later. The controller also feeds electric energy to a battery system. The energy generated from the wind turbine is also fed to a DC/AC converter directly or through the battery system. The supplied AC current may then be connected to a suitable utility panel fuse box and then to a grid and for household or end use.

Figure 7:
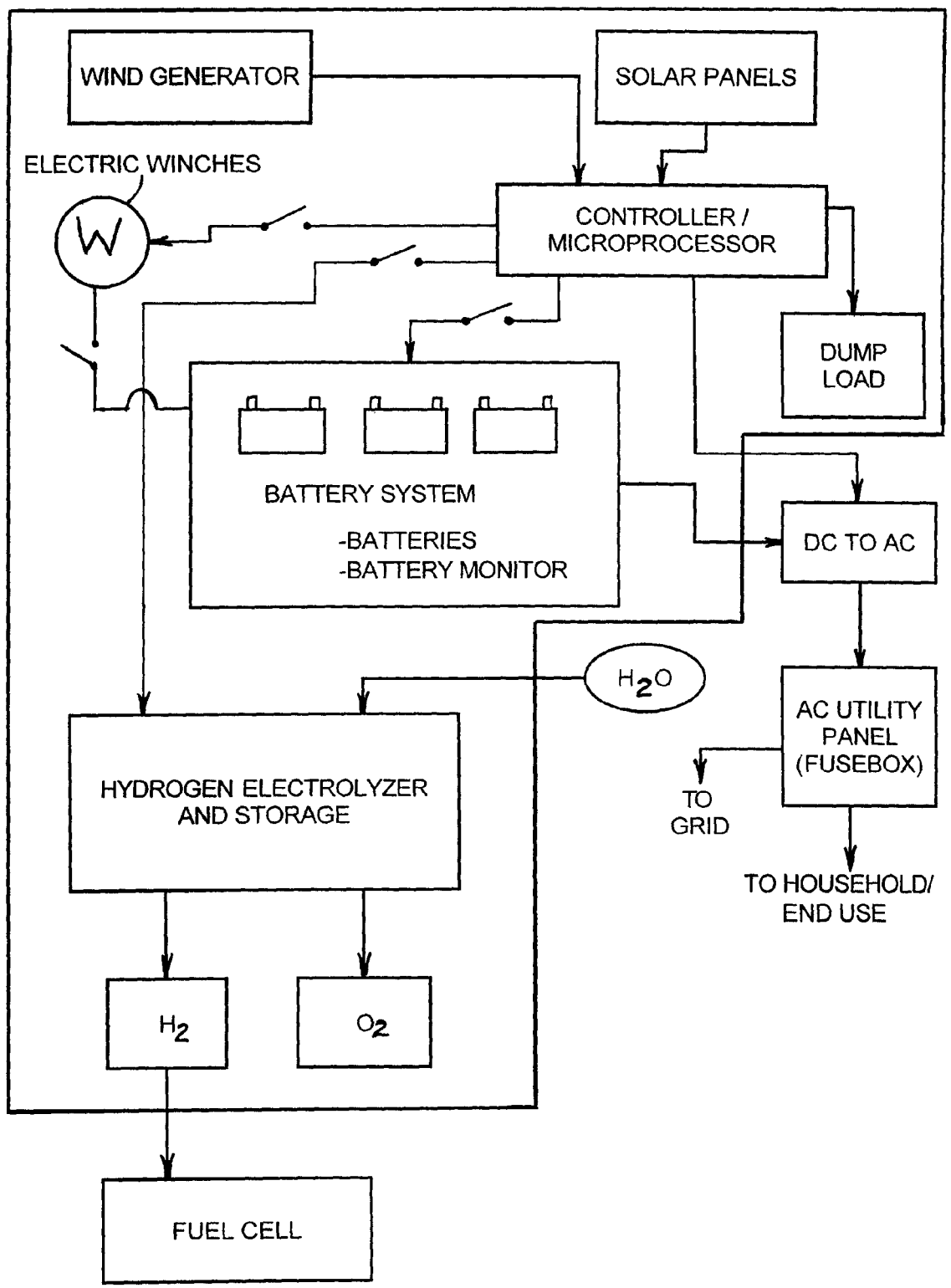
FIG. 7 is a block diagram of the energy generating electronics of the invention with the inverter outside the electronics package.

A manual override switch, shown in FIGS. 6 and 7 allows an operator to manually operate the winches.

It is to be appreciated that all of the wiring from the top wind generator turbine 19 to the microprocessor are enclosed within the hollow masts and are protected from the elements.

As an alternative to the static guyed wire third mast system shown, it is within the contemplation of this invention that the third mast be raised with a second set of winches and guyed wires. In this embodiment, the third mast guyed wires 14 would have one end attached to the lower end of the third mast as before but the other end of the third mast guyed wire 14 would be attached to third mast winches secured to the upper perimeter tower rails 4. These third mast winches would raise and lower the third mast independently of the second mast winches in an action similar to the operation of the second mast winches 12. In this third mast winch embodiment, the use of four third mast winches and four third mast guyed wires 14 is preferred. The microprocessor could be programmed to control the operation of the second and third mast winches separately or the set of winches could be controlled independently by manual controls.

As shown in FIG. 7, a hydrogen electrolizer system may also be an added feature. Energy in the form of wind is converted to electrical energy. The microprocessor feeds electrical energy to a hydrogen electrolizer that converts water to hydrogen and oxygen that can be stored and its energy be used as needed.

Some wind turbines use a maximum power point tracking system to maximize system output. This MPPT inverter uses an algorithm to allow the turbine blades to spin at the ideal rpm to produce an output voltage within the inverter's required range. Wind generator blades have a maximum efficiency at a specific ratio of blade tip speed to wind speed. This is referred to as the tip/speed ratio or TSR. A wind turbine's permanent magnet alternator has an open voltage (no load) that increases with rpm. But doubling the turbine's rpm does not double the output voltage. An inverter's MPPT is often used to control the wind turbine's blades to keep the blades spinning at their optimum TSR. This method of controlling the blade speed is similar to a variable speed transmission.

A unique feature of the present invention is the automatic adjustability of the height of the wind turbine to insure maximum efficiency, safety and stability of the entire system. A turbine operates at maximum efficiency when maximum energy is generated at the least wind speed.

Most wind turbines have maximum operating conditions. A wind turbine can only output a set amount of power. After that set maximum output point has been reached, it is irrelevant at what speed the turbine propellers turn, the maximum output will not increase. For example, the Delta I wind turbine manufactured by PacWind Corporation of California is rated for 2 kW at 28 mph but can output a maximum of 3.7 kW at 38 mph. However, after the wind has reached 38 mph, the turbine will not produce any more power even if the wind speed increases. Since wind high wind speeds can be dangerous to wind turbines, speeds at greater than 38 mph for such a turbine can only by harmful without any increase in energy generated.

The wind turbine of the present invention can be a wind sensor utilized to control the maximum wind speed of the turbine in conjunction with the microprocessor and the winches. The controller/microprocessor of the instant invention can sense the amount of energy (in kW) generated from the wind turbine. When that electrical energy reaches the maximum 3.7 kW of the above Delta I example, the microprocessor senses that the optimum height of the turbine has been reached. The controller can lower and raise the height of the tower in small increments until a small change in output is detected. The controller will then maintain the height of the tower until a constant change is detected. This constant change would be a change in the wind speed as measured by the electrical (kW) output of the wind turbine for a period of time (for example 90 to 300 seconds). After determining a change in the wind speed, the controller will raise or lower the turbine until the optimum wind speed (measured in terms of maximum electrical output) has been reached. The controller is constantly searching for its optimum wind speed, and hence tower height, thus maximizing the electrical output and safety of the entire system.

Having fully described my invention, I claim:

1. A portable wind turbine for generating electrical power, comprising:
   (1) a lower rail base;
   (2) vertical risers connected to the lower rail base and to a smaller, upper tower support;
   (3) a nested telescoping mast having main, second and third sections, wherein a lower end of said main section is attached to the lower rail base and wherein a higher part of said main section is supported by the upper tower support at approximately one-third of the vertical height of said main section;
   (4) second mast guy wires having one end attached to the lower end of the second mast section and the other end attached to at least one winch;
   (5) third mast static guy wires having one end attached to the lower end of the third section and the other end attached to the tower support;
   (6) said at least one winch attached to said upper tower support;
   (7) a controller having an electrical output circuit for feeding electrical energy to a utility connection, wherein said controller is electrically connected to a wind turbine and to said at least one winch, wherein said controller senses the amount of energy generated from the wind turbine and constantly searches for the maximum energy output at an optimum tower height by automatically raising or lowering the height of said turbine to generate said maximum energy at the least wind speed;
   (8) said wind turbine for generating electrical energy secured to the top of the third mast.

2. A portable wind turbine for generating electrical power, as in claim 1, further comprising second and third section rollers attached to the top of the main and second masts.

3. A portable wind turbine for generating electrical power, as in claim 1, further comprising storage batteries for receiving and storing electrical energy generated from said turbine.

4. A portable wind turbine for generating electrical power, as in claim 1, further comprising solar panels for generating electrical power.

5. A portable wind turbine for generating electrical power, as in claim 1, further comprising an electrolyzer for using electrical energy generated by said wind turbine and controller to convert water into hydrogen and oxygen.

6. A portable wind turbine for generating electrical power, as in claim 1, wherein said wind turbine is electrically connected to said controller by electrical wires located within said masts.

7. A portable wind turbine for generating electrical power, comprising:
   (1) a lower rail base;
   (2) vertical risers connected to the lower rail base and to a smaller, upper tower support;
   (3) a nested telescoping mast having main, second and third sections, wherein a lower end of said main section is attached to the lower rail base and wherein a higher part of said main section is supported by the upper tower support at approximately one-third of the vertical height of said main section;
   (4) second mast guy wires having one end attached to the lower end of the second mast section and the other end attached to at least one second mast winch;
   (5) third mast guy wires having one end attached to the lower end of the third mast section and the other end attached to at least one third mast winch;
   (6) said at least one second mast winch attached to said upper tower support;
   (7) said at least one third mast winch attached to said upper tower support:
   (8) a controller having an electrical output circuit for feeding electrical energy to a utility connection, wherein said controller is electrically connected to a wind turbine and to said at least one second mast winch and to said at least one third mast winch, wherein said controller senses the amount of energy generated from the wind turbine and constantly searches for the maximum energy output at an optimum tower height by automatically raising or lowering the height of said turbine to generate said maximum energy at the least wind speed
   (9) said wind turbine for generating electrical energy secured to the top of the third mast.

* * * * *